United States Patent
Ohuchi et al.

(10) Patent No.: US 6,392,809 B2
(45) Date of Patent: *May 21, 2002

(54) ARRAY LENS, LIGHTING OPTICAL SYSTEM, OPTICAL UNIT AND IMAGING APPARATUS

(75) Inventors: Satoshi Ohuchi, Kamakura; Masahiko Yatsu, Fujisawa; Taro Imahase, Fujisawa; Tomohiro Miyoshi, Fujisawa; Yasuo Otsuka, Chigasaki; Takesuke Maruyama, Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/793,599

(22) Filed: Feb. 27, 2001

Related U.S. Application Data

(63) Continuation of application No. 09/734,164, filed on Dec. 12, 2000, which is a continuation of application No. 09/327,191, filed on Jun. 7, 1999, now Pat. No. 6,201,645.

(30) Foreign Application Priority Data

| | | |
|---|---|---|
| Jun. 8, 1998 | (JP) | 10-158788 |
| Jun. 10, 1998 | (JP) | 10-161789 |
| Sep. 29, 1998 | (JP) | 10-275828 |

(51) Int. Cl.[7] ........................ G02B 27/10; G02B 27/12; G03B 27/42; F21V 9/14

(52) U.S. Cl. ................... 359/619; 359/629; 359/640; 355/53; 62/19

(58) Field of Search .................. 349/5; 355/53; 359/619, 629, 640; 362/19, 228, 268

(56) References Cited

U.S. PATENT DOCUMENTS

| 5,662,401 A | 9/1997 | Shimizu et al. ............... 353/38 |
| 5,865,521 A | 2/1999 | Hashizume et al. .......... 353/38 |
| 6,201,645 B1 * | 3/2001 | Ocuchi et al. .............. 359/621 |

FOREIGN PATENT DOCUMENTS

| JP | 3-111806 | 5/1991 |
| JP | 4-63318 | 2/1992 |
| WO | 97/50012 | 12/1997 |

* cited by examiner

*Primary Examiner*—Georgia Epps
*Assistant Examiner*—David N. Spector
(74) *Attorney, Agent, or Firm*—Mattingly, Stanger & Malur, P.C.

(57) ABSTRACT

The present invention discloses the structure of the array lens that at least any one of the diagonal size, vertical size and lateral size of lens cell is set to almost 1/(4.5 or more) for each corresponding size of the display elements. The diagonal size of lens cell is set to almost 0.18 inch of less. The total number of lens cells is set to almost 240 or more. Finally, the lens focal distance of lens cell is set to almost 30 mm or less.

21 Claims, 6 Drawing Sheets

ARRAY LENS, LIGHTING OPTICAL SYSTEM, OPTICAL UNIT AND IMAGING APPARATUS

This is a continuation application of U.S. Ser. No. 09/734,164, filed Dec. 12, 2000, which is a continuation application of U.S. Ser. No. 09/327,191, filed Jun. 7, 1999, now U.S. Pat. No. 6,201,645.

BACKGROUND OF THE INVENTION

Field of the Invention

The present invention relates to a technique of displaying images on a screen using a liquid crystal panel and other display elements, for example, a liquid crystal projector, a reflection type image displaying projector, a liquid crystal television and a projection type display apparatus.

A projection type imaging apparatus such as a liquid crystal projector has been popular, in which the display element such as a liquid crystal panel or the like is irradiated with a light beam emitted from a light source and thereby an image on the display element can be projected as an enlarged image.

In the imaging apparatus of this type, the light from the light source is adjusted through conversion to gray scale of each pixel with the display element and is then projected to the screen. For example, in the case of the twisted nematic (TN) type liquid crystal display element in which the display element is a typical example of the liquid crystal display element, two sheets of polarizing plates are arranged to result in a difference of 90 degrees of polarizing directions before and after the liquid crystal cell which is formed by supplying the liquid crystal to the space between a couple of transparent substrates having the transparent electrode films. In this case, amount of transmitting light of the incident light beam is controlled to display the image of information by combining the operations for rotating the polarizing plane with the electro-optical effect of the liquid crystal and selecting the polarizing element of the polarizing plate. In recent years, such transmitting type or reflection type display element has remarkably reduced the size of the element itself and also has improved performance such as resolution, etc.

Therefore, with advancement in size reduction and performance of the apparatus utilizing the display element, a projection type imaging apparatus has newly been proposed as an apparatus for not only realizing image formation by a video signal or the like which has been done in the related art, but also for use as an image output device of a personal computer. The projection type imaging apparatus of this type is particularly required to be small in size and to assure that a bright image can be obtained up to the corners of the display screen.

However, the projection type imaging apparatus of the related art has problems that the apparatus size is large and brightness and quality of image attained finally are insufficient.

For example, in the case of a liquid crystal display apparatus, size reduction of the light bulb, namely liquid crystal element itself is effective for size reduction of the apparatus as a whole, but when the liquid crystal display element is reduced in size, the area irradiated by the light of liquid crystal means becomes small, creating a problem in that a ratio in amount of light flux on the liquid crystal display element for amount of total light flux radiated by the light source (hereinafter, referred to as light application efficiency) becomes lower and side area of display screen becomes dark. Moreover, since the liquid crystal display element can utilize the polarized light beam of only one direction, about a half of the light beam emitted from the light source which radiates the random polarized light beam is left unused.

As a means for attaining the bright image at the four sides of the display screen, an integrator optical system, for example, has been proposed, in which a couple of lenses are used as described in the Japanese Published Unexamined Patent Publication No. HEI 3-111806. The integrator optical system divides the light from the light source with a plurality of condenser lenses in the shape of the rectangular opening forming a first array lens and then focuses in overlapping the output light in the shape of rectangular opening at the radiating surface (liquid crystal display element) with a second array lens formed by the condenser leans group corresponding to the condenser lenses in the shape of rectangular opening. In this optical system, intensity distribution of the light irradiating a the liquid crystal display element can be almost equalized. Meanwhile, as the optical system for irradiating the liquid crystal display element with the light beam emitted from the light source and arranged in one polarizing direction, a system is disclosed in the Japanese Published Unexamined Patent Publication No. HEI 4-63318, in which the light beam emitted from the light source and is polarized at random is isolated to the P-polarized light beam and S-polarized light beam using the polarizing beam splitter and these are then combined with a prism.

However, in the conventional integrator optical system, since a diagonal size of one lens cell of array lens is 0.25 inch or larger, an F value of the light system must be set to almost 2 or 3 in order to improve equality of brightness and quality of image using the liquid crystal display element with a micro-lens. As a result, distance between the first and second array lenses becomes not shorter than 31 mm, disabling reduction in size of the optical system. Therefore, it has been difficult for the projection type liquid crystal apparatus of the related art to reduce the size of apparatus exceeding the size of the A4 file size. Moreover, even in the optical system utilizing the polarizing beam splitter, it is difficult to realize matching in accuracy in the array lens and therefore size reduction has also been difficult. As a result, it has been difficult to simultaneously realize reduction in size of the apparatus as a whole and improvement in performance such as brightness. In addition, in the case of the projection type liquid crystal apparatus, it has also been difficult, even when only the lighting means is improved, to attain the display apparatus which is small in size and assures good display image quality because the image quality depends on various factors, in addition to such lighting means, such as optical characteristic of objection leans and optical characteristic of liquid crystal element.

Moreover, it has been required to use a larger array lens in order to improve brightness in the integrator optical system of the related art and when the projection type liquid crystal apparatus is reduced in size, brightness has been decreased. In addition, this phenomenon can also be observed when size reduction is conducted in the optical system using the polarizing beam splitter. As a result, it has been difficult to simultaneously realize size reduction of the apparatus as a whole and improvement in performance such as brightness. Moreover, when a polarized beam combining means is used, performance deterioration due to unwanted light beam, namely the P-polarized light beam entering the S light path has also been observed.

SUMMARY OF THE INVENTION

It is therefore an object of the present invention to improve disadvantages of the related art explained above, assure sufficient brightness and good image quality and provide the image display technique which enables higher accuracy and sufficient reduction in size of apparatus.

In order to attain the objects explained above, the present invention provides the structure that:

(1) an array lens is provided, in which at least any one of the diagonal size, vertical size and lateral size of the lens cell is equal to almost 1/(4.5 or more) for each corresponding size of a display element which is irradiated by a lighting optical system;

(2) an array leans is provided, in which a diagonal size of the lens cell is almost 0.18 inch or less;

(3) an array lens is provided, in which the total number of lens cells is almost 240 or more;

(4) an array lens is provided, in which the lens focal distance of lens cell is 30 mm or less;

(5) a light shielding means is provided to eliminate unwanted light beam to the light incident side than the light source unit or light isolating means for isolating the light emitted from the array lens to the P-polarized light beam and S-polarized light beam; and (6) a first array lens for condensing the light from the light source unit to form a plurality of secondary light source images, a second array lens for focusing a lens image of the first lens array lens to the display element, an isolating means for isolating the light beam emitted from the light source unit or from the array lens into the P-polarized light beam and S-polarized light beam, and a converting means for changing any one beam of the P-polarized light beam and S-polarized light beam of the output light beam emitted from the isolating means are arranged almost on the same optical axis as a linear line.

DETAILED DESCRIPTION OF THE PREFERRED EMBODIMENTS

The preferred embodiments of the present invention will be explained with reference to the accompanying drawings.

Figure 1:
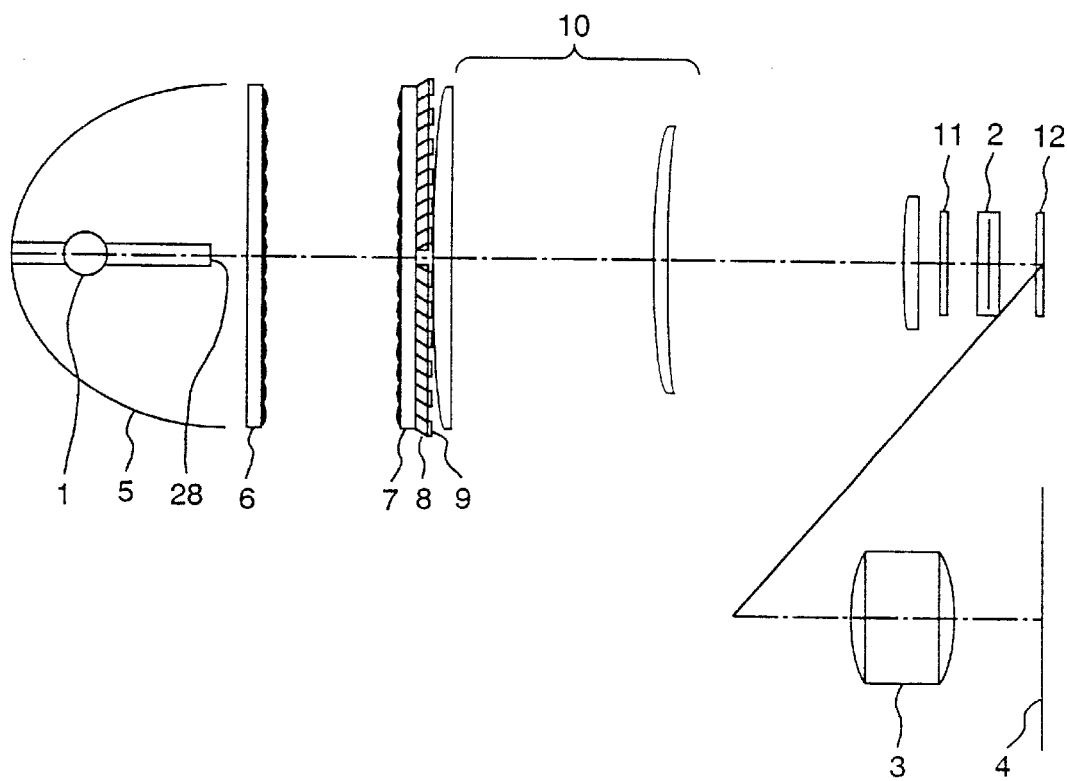
FIG. 1 is a diagram illustrating a preferred embodiment of the present invention.

FIG. 1 illustrates a first preferred embodiment of the projection type liquid crystal display apparatus of the present invention. In FIG. 1, the projection type liquid crystal display apparatus is provided with a light source 1. This light source 1 is formed of a super-high pressure mercury lamp, metal halide lamp, xenon lamp, mercury xenon lamp and a white lamp such as halogen lamp. The light source 1 has at least one reflecting mirror 5 having a circular or polygonal light emitting aperture and an electrode wire 28 having the diameter, for example, of 0.6 mm or less provided at one side of the lamp electrode in the reflecting mirror and the light beam emitted from this light source 1 travels toward a projection lens 3 passing through a liquid crystal display element 2 as a light bulb element and is then projected to a screen 4.

The light beam radiated from a bulb of the light source 1 is condensed by a reflector 5 having the elliptical surface, parabolic surface or non-spherical surface and then enters a first array lens 6. After passing the first array lens 6, the light beam passes a second array lens 7 and then enters a polarized beam splitter 8. This incident light beam is isolated, as the transmitting light beam, to the P-polarized light beam and S-polarized light beam by the polarized beam splitter 8, and the P-polarized light beam is rotated by 90 degrees in the polarizing direction by a λ/2 phase difference plate 9 arranged at the light emitting side surface of the polarized beam splitter 8 to become the S-polarized light beam and is then incident to a condenser lens 10. Moreover, the S-polarized light beam repeats reflection and is then emitted from the light emitting surface of the neighboring polarized beam splitter 8 and then enters the condenser lens 10. The condenser lens 10 is formed of at least one or more sheet of lens having the positive index of refraction and has a function to further condense the S-polarized light beam. The light beam having passed the condenser lens 10 irradiates the liquid crystal display element 2. At the incident side of this liquid crystal display element 2, an incident light polarizing plate 11 transmitting the S-polarized light beam is arranged.

In the projection type liquid crystal display apparatus of the related art, the polarized light beam of only one direction is transmitted through combination of the incident light polarizing plate 11, liquid crystal display element 2 and light emitting side polarizing plate 12 and thereby amount of light to be transmitted has been reduced to almost a half. However, since the polarized light beam splitter 8 is used in the preferred embodiment, the polarizing directions of the randomly polarized light beams emitted from the light source 1 are equalized in one polarizing direction and this light beam is then input to the liquid crystal display element 2. Ideally, the brightness two times that of the projection type liquid crystal display apparatus of the related art can be attained.

Moreover, in this embodiment, the first array lens 6 and second array lens 7 of the present invention are same in the type thereof and lateral size of one lens cell has the ratio of almost 1/5.3 against the lateral size of the liquid crystal display element. For example, when the diagonal size of rectangular image display means of the liquid crystal display element 2 is 0.9 inch, the diagonal size of rectangular shape of one lens cell is almost 0.17 inch, the total number of lens cells forming the first array lens 6 and second array lens 7 is 240 or more and the focal distance of one lens cell is 30 mm or less, thereby realizing reduction in size of optical system. Moreover, individual images of almost 240 or more cells are overlapped on the liquid crystal display element 2 to obtain more uniform image quality than that of the apparatus of related art. In addition, since the cell size is 0.17 inch, even when the shadow of electrode wire 28 crosses the cell, image quality may be equalized because the number of cells is 240 or larger (almost 16×15 cells). Accordingly, the projection type liquid crystal display apparatus can realize simultaneously size reduction of the apparatus as a whole and improvement of brightness.

Furthermore, the present invention provides the effect that the unwanted light beam is cut by the polarized beam splitter 8 formed by adding the light shielding plate 11 to the optical axis incident surface of the reflection prism of the S-polarized light beam located at the center of the pitch of the optical axis of the first array lens 6 and/or second array lens 7, namely at the surface in the side of the first array lens 6 and/or second array lens 7 and when unwanted light beam is absorbed and cut by the incident light polarizing plate 11, heat radiation occurring when the light beam is converted to heat through energy conversion can be prevented. Moreover, color irregularity generated when unwanted light beam enters the liquid crystal display element 2 can also be reduced.

Moreover, the polarized beam splitter 8 of the present invention 8 is formed thinner in the optical axis direction then the second array lens 7 to realize shortening of the total length of optical system, light weight of the optical unit and increase of F value of the lighting system. Thereby, since small size and light weight can be realized and moreover F value of the projecting lens 3 can also be increased in connection with the lighting system, the projecting lens 3 can also be reduced in size and weight.

The light beam having passed the liquid crystal display element 2 reaches the display screen 4 passing the projecting means 3 such as, for example, a zoom lens. An image formed on the liquid crystal display element 2 by the projecting means 3 is projected on the screen as the enlarged image by the function of the display apparatus.

Next, a practical embodiment of the present invention will be explained.

Figure 2:
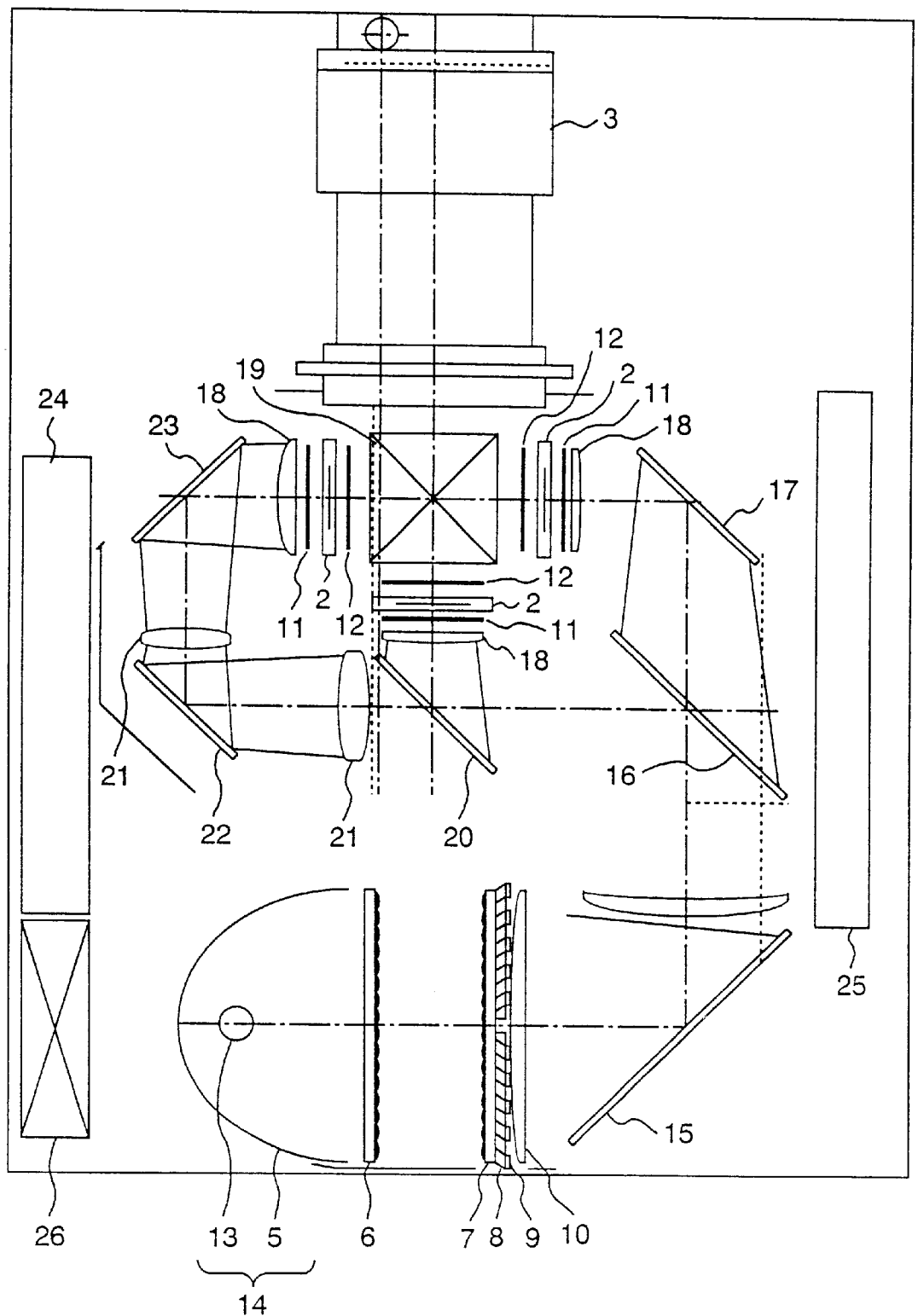
FIG. 2 is a diagram illustrating a structure of the apparatus as a preferred embodiment of the present invention.

FIG. 2 is a schematic diagram illustrating the structure of the projection type liquid crystal display apparatus of the present invention. The embodiment of FIG. 2 is a 3-plate type projection display apparatus using three transmitting type liquid crystal display elements 2 as the liquid crystal light bulbs corresponding to so-called three primary colors of R(Red), G(Green) and B(Blue). In this embodiment, the light beam emitted from the lamp 13 such as, for example, super-high pressure mercury lamp as the light source is once reflected by a parabolic reflection mirror type reflector 5 and is thereafter incident to the first array lens 6 which is formed by a plurality of condenser lenses provided at the rectangular frame almost in the same size as the light emitting aperture of such parabolic reflection mirror type reflector 5 to condense the light emitted from the lamp unit 14 and form a plurality of secondary light source images and then passes the second array lens 7 which is formed by a plurality of condenser lenses and located at the area near a plurality of secondary light source images to focus individual lens images of the first array lens 5 to the liquid crystal display element 2. This light beam emitted from the second array lens 7 is incident to a line of rhombus prisms almost in the ½ size of width of each lens arranged in such a manner as fitting to the pitch in the lateral direction of the optical axis of lens of the second array lens 7. A film of the polarized beam splitter 8 is formed on the surface of this prism and therefore the incident light beam is isolated to the P-polarized light beam and S-polarized light beam by the polarized beam splitter 8. The P-polarized light beam travels in straight in the polarized beam splitter 8, it is then rotated by 90 degrees in the polarizing direction by the λ/2 phase difference plate 9 provided at the light emitting surface of the prism and is then emitted after it is converted to the S-polarized light beam. Meanwhile, the S-polarized light beam is reflected by the polarized beam splitter 8, it is then reflected again in the intrinsic optical axis direction within the neighboring rhombus prism and it is emitted as the S-polarized light beam. Of course, the polarized beam splitter 8 of the present invention adds a light shielding member 27 (see FIG. 4A and FIG. 4B) to the optical axis incident surface of the reflection prism of the S-polarized light beam located at the center of the pitch of the optical axis of each lens of the second array lens 7, namely to the surface in the side of the second array lens 7. Thereafter, light beam is condensed to the liquid crystal display element 2 by the condenser lens 10. In the course of this process, the light beam emitted from the polarized beam splitter 8 is bent in its optical path by 90 degrees with a total reflection mirror 15 and a B(Blue), G(Green) reflection dichroic mirror 16 allows the R (Red) color light beam to pass and reflects the B, G lights. The R light beam having passed the dichroic mirror is bent in its optical path by 90 degrees with the total reflection mirror 17 for R light beam, passes through the condenser lens 18 and incident polarizing plate 11 provided before the liquid crystal display element, is incident to the liquid crystal display element 2 formed of an opposing electrode and liquid crystal or the like and then passes through the polarizing plate 12 provided in the light emitting side of the liquid crystal display element 2.

The liquid crystal display element 2 is provided with the liquid crystal display areas in such number (for example, 800 pixels in lateral direction×600 pixels in vertical direction for each color of three colors) corresponding to the display pixels. Depending on the signal driven from the external side, polarizing angle of each pixel of the liquid crystal display element 2 changes and finally the light in the direction matched with the polarizing direction of the polarizing plate 12 is emitted and the light in the orthogonal direction is absorbed by the polarizing plate 12. The light polarized by the intermediate angle determines amount of light beam passing through the polarizing plate and amount of light beam absorbed by the polarizing plate in relation to the polarizing angle of the polarizing plate 12. As explained above, an image is projected conforming to the external input signal.

The R light beam emitted from the polarizing plate 12 is reflected by the dichroic prism 19 having the function to reflect the R light beam, then enters the projecting means 3 such as a zoom lens and is then projected to the display screen.

On the other hand, the B light beam and G light beam having passed the B, G transmitting dichroic prism 19 enter a G-reflection dichroic mirror 20. This mirror 20 reflects the G light beam. The reflected G light beam then passes through the condenser lens 18 and incident polarizing plate 11 provided before the liquid crystal display element 2 and then enters the liquid crystal display element 2 and passes through the polarizing plate 12 provided in the light emitting side of the liquid crystal display element 2. The G light beam emitted from the polarizing plate 12 passes through the dichroic prism 19 having the function to transmit the G light beam, enters the projection lens 3 and is then projected to the display screen.

Meanwhile, the B light beam transmitted through the G reflection dichroic mirror 20 passes through a relay lens 21, it is then bend in the optical path by 90 degrees with a total reflection mirror 22 to pass through the relay lens 21, thereafter it is then bent again in its optical path by 90 degrees with a total reflection mirror 23 to pass through the condenser lens 18 and incident polarizing plate 11 provided before the liquid crystal display element, it enters the liquid crystal display element 2 and finally passes through the polarizing plate 12 provided in the light emitting side of the liquid crystal display element. The B light beam emitted from the polarizing plate 12 is reflected by the dichroic prism 19 having the function to reflect the B light beam and thereafter enters the projection lens 3 for projection to the display screen.

Moreover, the B light beam transmitted through the G reflection dichroic mirror 20 passes through the relay lens 21, it is then bent in its optical path by 90 degrees with the total reflection mirror 22 to pass the relay lens 21, thereafter it is bent again in its optical path by 90 degrees with the total reflection mirror 23 to pass the condenser lens 18 and incident polarizing plate 11 provided before the liquid crystal display element, it enters the liquid crystal display element 11 to pass through the polarizing plate 12 provided in the light emitting side of the liquid crystal display element 2. The B light beam emitted from the polarizing plate 12 is reflected by the dichroic prism 19 having the function to reflect the B light beam and enters the projection lens 3 for projection to the display screen.

As explained above, the light beams respectively corresponding to R, G, B are isolated and combined by the color isolating means and color combining means and the images of respective colors are combined on the screen to attain the enlarged image by enlarging the image on the liquid display element respectively corresponding to R, G, B with the projection lens 3. In the same figure, the power supply circuit 24 and image signal circuit 25 are arranged as illustrated in the figure and heat generated by the light source 1 is guided to the external side with a blowing fan 26. Moreover, in this embodiment, the light beams emitted randomly from the light source are aligned in one direction and therefore less amount of heat is generated from the incident polarizing plate.

Moreover, the light source and projecting means are arrange in such a manner that the optical axes thereof are orthogonal with each other and in addition, the apparatus as a whole can be reduced in size by arranging the power supply circuit 24 and image signal circuit 25 as illustrated in the figure via the color isolating and combining unit consisting of the color isolating means and liquid crystal display element and color combining means.

In addition, in this embodiment, the first array lens 6 and the second array lens 7 used in the present invention are formed in the same shape, the lateral size of one lens cell has a ratio of about 1/5.3 of the lateral size of the liquid crystal display element 2. For instance, when the diagonal size of rectangular shape of the image display area of the liquid crystal display element 2 is 0.9 inch, the diagonal size of rectangular shape of one lens cell of the fist array lens 6 and second array lens 7 is about 0.17 inch, the diagonal size of rectangular shape of one lens cell of the first array lens 6 and second array lens 7 is about 0.17 inch, the total number of lens cells forming the first array lens 6 and second array lens 7 is about 240 or more and the focal distance of one lens cell of the first array lens 6 and second array lens 7 is 30 mm or less. As a result, size reduction of the optical system can be attained. Moreover, individual images of almost 240 or more cells are overlapped on the liquid crystal display element 2 and thereby more homogeneous image than that of the apparatus of related art can be obtained.

In addition, even if the shadow of the electrode wire 28 is crossing the cell because the cell size is 0.17 inch, when the number of cells exceeds about 240 cells (almost 15×15 cells), image quality can be more equalized. Therefore, size reduction and improvement of brightness of the apparatus as a whole can be realized simultaneously in the projection type liquid crystal display apparatus.

Moreover, when it is required to improve brightness and homogeneity of image using the liquid crystal display element with micro-lens or the like, the F value of the lighting system must be set to about 2 to 3. Even in this case, an interval of the first array lens and second array lens of the present invention can be reduced to the distance of 30 mm or less and as a result the size reduction of optical system can be realized.

Furthermore, in the present invention, since a polarizing and combining means (in some cases, a light shielding member is added) is combined and the polarized beam splitter 8 as the polarizing and combining means is formed thinner than the second array lens 7 (namely, the polarizing beam splitter 8 is set to 2 mm or less when the second array lens 7 is about 2.5±0.5 mm), length of optical path can be shortened and the total reflection mirror 15 can be arranged closely, thereby resulting in size reduction of the set.

In the embodiment of the present invention illustrated in FIG. 2, the lighting and optical system comprises a lamp unit 14, a first array lens 6, a second array lens 7, a polarized beam splitter 8, a $\lambda/2$ phase difference plate 9, a condenser lens 10 and a total reflection mirror 15 and establishes the optical path until the part for isolating the light beam emitted from the lamp 13 to the R, G, B light beams. Moreover, the optical unit includes the lighting and optical system to define the process up to the isolation of the light beam emitted from the lighting and optical system to the R, G, B light beams respectively using the B (Blue), G(Green) reflection dichroic mirror 16 and G reflection dichroic mirror 20 or the like and also to define the optical path up to the projecting means 3 via the dichroic prism 19 which allows application of the isolated R, G, B light beams to the respective liquid crystal display element 2, reflects the R light beam and B light beam and transmits the G light beam.

Figure 3:
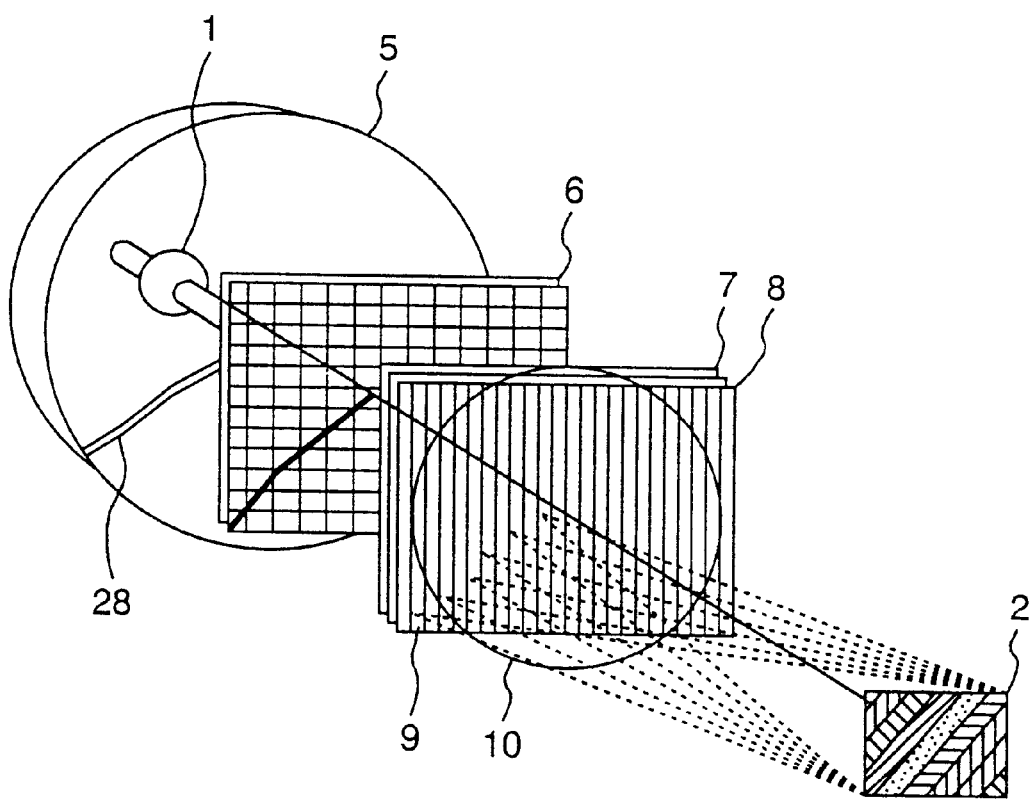
FIG. 3 is a diagram explaining the effect of a preferred embodiment of the present invention.

FIG. 3 is a diagram illustrating a part of effect of the first embodiment of the present invention.

FIG. 3 illustrates the lighting and optical system of the projection type liquid crystal display apparatus. The light source 1 has a circular reflecting mirror 5 and an electrode wire 28 having the diameter of almost 0.6 mm or less provided at the single side of the lamp electrode within the reflecting mirror 5.

The light beam radiated from a bulb of the light source 1 is condensed by an elliptical surface or parabolic surface or non-spherical surface reflector 5 and is then incident to the first array lens 6. After passing the first array lens 6, the light beam passes the second array lens 7 and then enters the polarized beam splitter 8. The transmitted light of this incident light beam is isolated to the P-polarized light beam, while the reflected light thereof is isolated to the S-polarized light beam respectively by the polarized beam splitter 8. The P-polarized light beam is rotated by 90 degrees in its polarizing direction by the $\lambda/2$ phase difference plate 9 provided at the light emitting side surface of the polarized beam splitter 8 to become the S-polarized light beam and enters the condenser lens 10. Moreover, the S-polarized light beam is repeatedly reflected and is then emitted from the light emitting surface of the neighboring polarized beam splitter 8 to enter the condenser lens 10. The condenser lens 10 is formed of at least a sheet of lens or more lenses having the positive index of refraction having the function to further condense the S-polarized light beam. The light beam having passed the condenser lens 10 irradiates the liquid crystal display element 2.

Referring to FIG. 3, the first array lens 6 and second array lens 7 of the present invention are formed in the same shape. The lateral size of one lens cell has a ratio of almost 1/5.3 of the lateral size of the liquid crystal display element 2. For example, when the diagonal size of rectangular shape of the image display area of the liquid crystal display element 2 is 0.9 inch, the diagonal size of rectangular shape of one lens cell of the first array lens 6 and second array lens 7 is almost equal to the size of 0.17 inch, the total number of lens cells forming the first array lens 6 and second array lens 7 is 240 or more and the lens focal length of one lens cell of the first array lens 6 and second lens array 7 (FIG. 3 is a schematic diagram) is 30 mm or less. Accordingly, size reduction of optical system can be attained. Moreover, as indicated by dotted line of FIG. 3, individual images of 240 cells or more are overlapped on the liquid crystal display element 2 and more homogeneous image quality than that of the related art can be obtained. In addition, since the cell size is 0.17 inch, even if the shadow of the electrode wire 28 crosses the cell, when the number of cells is about 240 (almost 16×15 cells) or more, seven (7) to eight (8) lines are arranged in the single side. When the cell size is 0.17 inch, six lines of belt type shadow having the width of almost 0.6 mm are arranged in one cell size. Therefore, when at least six lines are arranged in the single side of cell, dark area resulting from shadow of the electrode wire 28 on the liquid crystal display element can be freed and resultant color irregularity can also be eliminated and homogeneous image quality can be attained. In this case, since the electrode wire exists in the single side of the right and left sides of the optical axis center, when one to two lines are provided as the allowance of the vertical or horizontal arrangement of array lens, 14 to 16 lines in minimum are required. Accordingly, when the number of cells is about 240 or more, shadow of the electrode wire of almost 0.6 mm or less is reflected equally like the diagonal line of the figure on the liquid crystal display element. Thereby, image quality assuring equal brightness and no color irregularity can be attained.

Therefore, the projection type liquid crystal display apparatus can simultaneously realize reduction in size and improvement in brightness of the apparatus as a whole. Moreover, since the first array lens 6 and second array lens 7 are formed in the same shape, only one type is used and cost reduction can also be attained.

FIG. 4 is a diagram illustrating the second embodiment of the present invention.

Figure 4A:
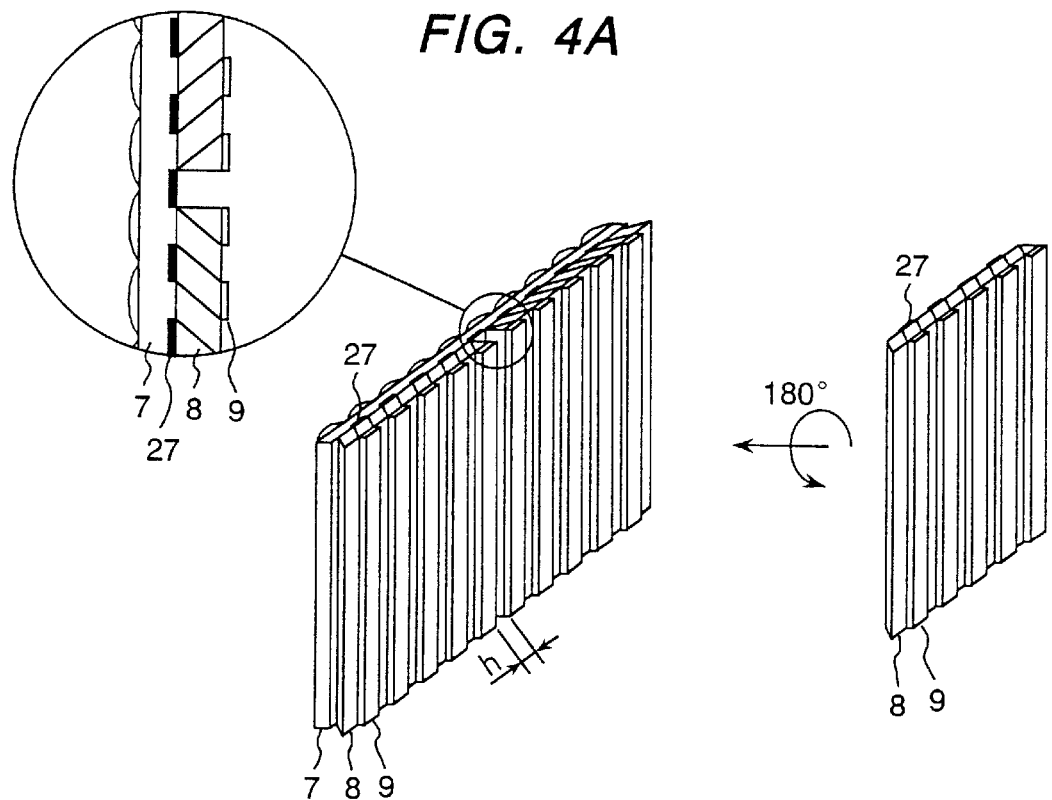
FIG. 4 is a diagram illustrating a preferred embodiment of the present invention.
Figure 4B:
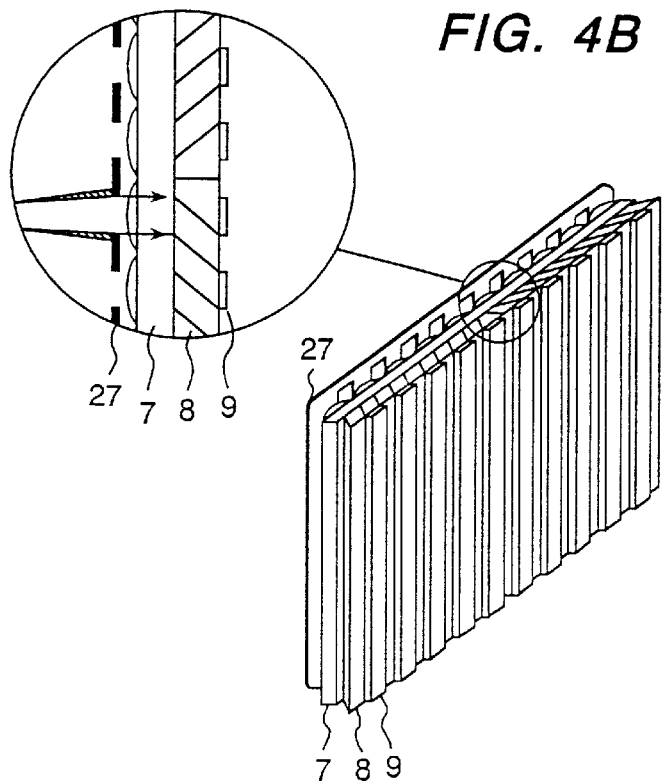

The polarized beam splitter 8 illustrated in FIG. 4A and FIG. 4B is provided with a polarized beam splitter film at the glass plate thereof for isolating the P-polarized light beam and S-polarized light beam. After this film is laminated using a bonding agent, the glass plate is sliced in the angle of 45 degrees. Therefore, as illustrated in FIG. 4, there is provided a flat plate structure wherein a plurality of longitudinally elongated rhombus prisms are arranged. Such filming may be attained by conducting the mirror evaporation of aluminum or silver or the like in every other surface. However, since this mirror section has a role of reflecting the S-polarized light beam, it is required to provide a certain means for not allowing the light beam to enter the light path of the prism.

Therefore, the polarized beam splitter 8 of the present invention adds a light shielding member 27 to the optical axis incident surface of the S-polarized light beam reflection prism located at the center of the pitch of the optical axis of each lens of the second array leans 7, namely to the surface in the side of the second array lens 7 to provide the effect that unwanted light beams can be cut and when the light beam is absorbed and cut by the incident polarizing plate 11, the heat generated through energy conversion from the light beam to heat energy can be prevented. This light shielding member 27 is formed of slit type reflection films, or ground glass type dispersion films, or metal seal for light shieldings, or heat-proof seals, or slitted metal plates, or metal plating, or the like in every other one formed with silver or aluminum evaporation film.

In the flat plate structure where a plurality of polarized beam splitters 8 are arranged as explained above, they are bonded in every other line, it is also possible that the isolated P-polarized light beam is converted to the S-polarized light beam, the light beam emitted from the polarized beam splitter 8 is totally set to the S-polarized light beam, or after the isolated S-polarized light beam is emitted by reflection from the prism adjacent to the incident prism, the light beam emitted from the polarized beam splitter 8 is totally set to the P-polarized light beam with the $\lambda/2$ phase difference plates 9.

When a plurality of rhombus prisms of the flat type polarized beam splitter 8 explained above are arranged conforming to the pitch, in the lateral arrangement direction, of the lens optical axis of the second array lens 7 and one polarized beam splitter 8 and the other polarized beam splitter 8 are bonded symmetrically in the right and left sides of the center under the condition rotated each other by 180 degrees in such a manner that the second array lens 7 is divided respectively to half areas in the right and left or upper and lower sections keeping a clearance, for example, h equal to ½ of the width of the optical axis pitch at the center of the second array lens 7, the light shielding member 27 provided in the second array lens 7 can be matched in higher accuracy with the pitch in the lateral arrangement direction of the polarized beam splitter 8 and thereby highly accurate bonding among the second array lens 7, light shielding member 27 and polarized beam splitter 8 which has been considered difficult in manufacturing process can be realized.

In the structure of the related art, since the light transmitting efficiency is lowered even when interface is formed of reflection-proof film in such a case that the flat type polarized beam splitter 8 formed symmetrically in the right and left direction as illustrated in FIG. 4A or FIG. 4B and interface between optical parts such as this polarized beam splitter 8 and second array lens 7 is formed of the layer of air, this polarized beam splitter 8 and the second array lens 7 are bonded conforming to the pitch in the lateral arrangement direction of the lens optical axis and the polarized beam splitter 8. In this case, the slit type light shielding plate to cut the unwanted light beam is arranged before the second array lens 7, namely in the side of light source in view of shielding the unwanted light element, namely the hatched element in the FIG. 4B before the light beam enters the polarized beam splitter 8. However, in this case, the light shielding member 27 is formed of a member such as metal plate having a slit and therefore it must be supported independent of the optical axis.

For this reason, the required light beam also has been shielded due to part accuracy error or assembling accuracy error of the light shielding member 27 and the number of parts has also been increased even in the case of assembling, resulting in increase of processing cost.

However, in the present invention, since the polarized beam splitter 8 is bonded symmetrically in the right and left direction in both sides of the center to the second array lens 7 providing the light shielding member 27 and the light shielding member 27 is formed of an evaporation film or the like, the light incident surface of the prism in the S light path can be shielded almost without any error and the number of parts can also be reduced to improve the assembling efficiency.

Moreover, in the present invention, the process of the second stage that the flat type polarized beam splitter 8 which is symmetrical in the right and left direction is produced by a maker and is then bonded to the second array lens 7 like the prior art is eliminated but a couple of polarized beam splitters 8 are bonded to the second array lens 7 in the process of the first stage. As a result, processing cost can be lowered.

In addition, since the polarized beam splitter 8 of the related art is integrated in the right and left sides, the bonding accuracy is overlapped from the left end to the right end and therefore when the beam splitter 8 is bonded to the second array lens 7, it is shared at the center to the right and left side, certainly resulting in the bonding accuracy error in the right and left sides, for example, the error of ±0.25 in both right and left sides.

However, in the present invention, since the polarized beam splitter 8 is bonded to the second array lens 7 providing individual light shielding members 27 in the right and left sides, the accuracy error from the center is never accumulated and therefore since the left polarized beam splitter 8 can define the left center thereof or the lens optical axis of the left half on the second array lens 7 in a large amount of light beam as the center for accuracy sharing, the accuracy error can be controlled to ±0.125 in the numerical value. When the right side polarized beam splitter 8 is bonded to the second array lens 7 in the same manner, the effect to reduce the bonding accuracy error can also be attained as in the case of the left side. Thereby, positional displacement of the optical axis due to the bonding error of the polarized beam splitter 8 in the half width of the lens optical axis pitch of the second array lens 7 can be reduced and amount of incident light beam from the second array lens 7 to be reflected by the polarized beam splitter 8 can also be reduced. Accordingly, the light transmitting efficiency can be improved to realize improvement in brightness. The polarized beam splitter 8 is naturally formed thinner than the first or second array lens 7 and when it is required to shield the light beam with an evaporation film, the evaporation system is different from that when the polarized beam splitter 8 formed thicker than the ordinary second array lens 7 is used. Namely, it is necessary for not cutting the light beam to be used to set the area of the light shielding means to realize light shielding for rather narrower area by considering the bonding accuracy error rather than the P-polarized light beam aperture or S-polarized light beam aperture of the polarized beam splitter 8 for light shielding.

Such accuracy of light shielding means, for example, an idea for making the width of light shielding film a little smaller than the pitch width of the polarized beam splitter 8 is effective for improvement of light efficiency when a larger number of cells are used for the polarized beam splitter S which is thinner than the second lens array 7 and the second lens array 7. Moreover, in some cases, it is also effective that many reference positions are prepared and the polarized beam splitter 8 is divided for the bonding as will be explained later considering the bonding accuracy.

Figure 5:
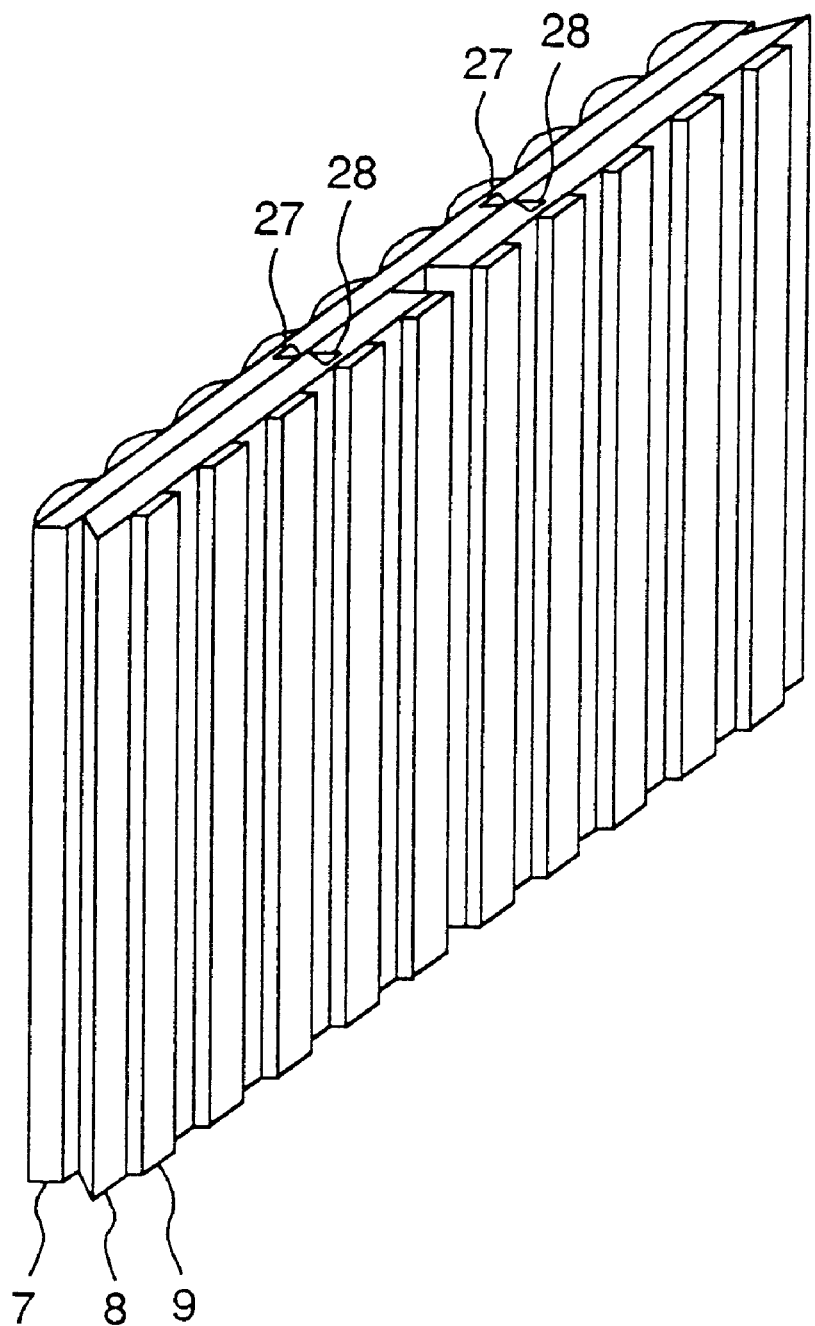
FIG. 5 is a diagram illustrating the other preferred embodiment of the present invention.

FIG. 5 is a diagram illustrating the external view of the third embodiment of the present invention. In the present invention, the first array lens 6 or second lens array 7 is provided with a first positioning section 27 as the positioning reference of each lens and the polarized beam splitter 8 is also provided a second positioning section 28 as the positioning reference. This first positioning section 27 and the second positioning section 28 are respectively formed by the engraving (illustrated in FIG. 5), recessed area, projected area, end surface, cutout area, stepped area or marking or the like and the absolute positioning of the first array lens 6 or second array lens 7 can be performed by aligning the first positioning section 27 to the positioning area (not illustrated) provided to the structure member for supporting and fixing the first array lens 6 or second array lens 7. In the same manner, the absolute positioning of the polarized beam splitter 8 can also be performed by aligning the second positioning section 28 of the polarized beam splitter 8 to the positioning area (not illustrated) provided to the structure member for supporting and fixing the polarized beam splitter 8.

According to the present invention, respective reference positioning can be made easily when assembling the first array lens 6, second array lens 7 and polarized beam splitter 8 to the optical part supporting structure member and relative lens optical axes of the first array lens 6 and array lens 7 may be matched at the design position and arrangement of polarized beam splitter 8 can be located at the position resulting in the maximum light application efficiency conforming to the lateral arrangement pitch of the lens optical axis explained above. Thereby, optical performance can be improved and the assembling work of these optical parts can be simplified to improve the working efficiency.

In addition, as illustrated in FIG. 5, the polarized beam splitter 8 can be arranged to the optimum position for each lens optical axis of the second array lens 7 by providing the first positioning section 27 of the second array lens 7 and the second positioning section 28 of the polarized beam splitter 8 to the positions to be matched and then matching these positioning sections at the time of assembling. Thereby, matching can be made to the position providing the maximum light application efficiency in view of improving the optical performance.

FIG. 6 is a diagram illustrating the external appearance of the fourth embodiment of the present invention. In the present invention, the first array lens 6 or second array lens 7 is provided with the first positioning section 27 as the positioning reference of each leans and the polarized beam splitter 8 is provided with the second positioning section 28 as the positioning reference. These first positioning section 27 and second positioning section 28 are formed as the recessed area and projected area as illustrated in FIG. 6A. These first and second positioning sections 27, 28 are combined to match the projected area and recessed area for the positioning so that the polarized beam splitter 8 is located at the optimum position for the lens optical axis of each lens of the first array lens 6 or second array lens 7 and thereafter the polarized beam splitter 8 can be bonded to the first array lens 6 or the second array lens 7. Accordingly, matching can be made to the position providing the maximum application efficiency of the light and bonding explained above assures reduction in amount of light reflected at the interface of the optical elements and improvement in the optical performance.

Figure 6A:
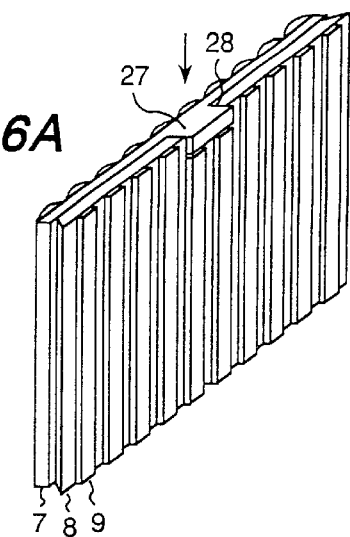
FIG. 6 is a diagram illustrating the other preferred embodiment of the present invention.
Figure 6B:
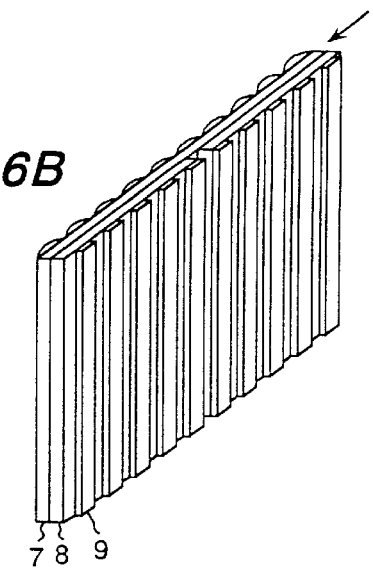
Figure 6C:
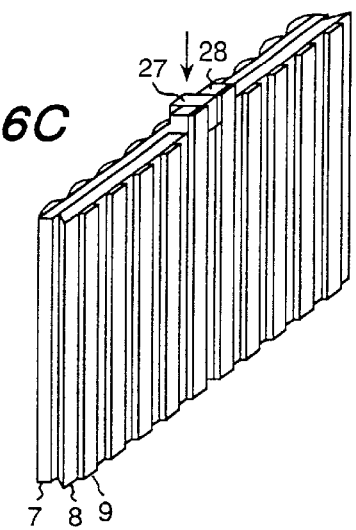
Figure 6D:
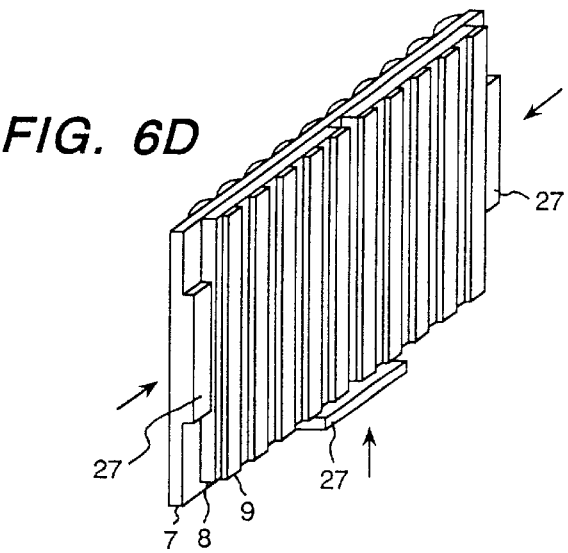
Figure 6E:
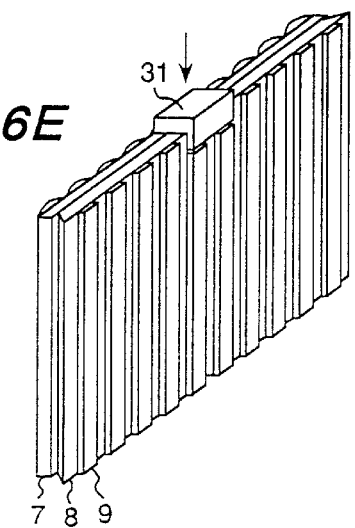

In addition, the first positioning section 27 and second positioning section 28 are not limited to the recessed area and projected area and these may be FIG. 6B in which end faces of each part are positioned so as to coincidence with optical axes as illustrated, or FIG. 6C the first positioning section 27 is positioned in the second positioning section 28 as illustrated, or FIG. 6D the type where entire part of one positioning frame is engaged with the other frame as illustrated, or FIG. 6E the type where both sections are positioned and bonded via a third member such as the positioning jig 31 or the like as illustrated. Moreover, it is also possible to improve accuracy by designing the sizes, considering the accumulated element accuracy error, so that the polarized beam splitter 8 is located to the optimum position for each lens optical axis of the array lens.

According to the present invention, length of optical path can be shortened and the apparatus can be reduced in size.

Brightness can also be improved. Moreover, image quality improvement such as equalization of image quality can also be realized. In addition, generation of heat due to unwanted light beam can also be prevented.

The present invention allows any modification of the embodiment explained above without departing from the spirit and scope of the principal characteristics thereof. The embodiment explained above is therefore only an example of the present invention and should not be limited thereto. The scope of the present invention is limited only by the appended claims. Moreover, any modifications and changes in regard to the appended claims should be within the scope of the present invention.

What is claimed is:

1. An optical unit comprising:
   a light source unit for emitting light;
   an image display element having a light valve in which said light emitted from said light source unit is formed in to an optical image in accordance with a video signal supplied thereto;
   a light optical system for irradiating said light from said light source unit to said image display unit;
   a projector for projecting light emitted from said image display element;
   a reflector having one of a rectangular light emitting aperture, a circular light emitting aperture and a polygonal light emitting aperture;
   a plurality of condenser lenses provided in the same size of said light emitting aperture;
   a first array lens for forming a plurality of secondary order light source image by condensing said light from said light source unit;
   a second array lens provided in the vicinity of said plurality of said secondary order light source image and focusing each of a lens image of said first array lens to said image display element;
   a plurality of polarizing and composing parts comprising a polarized beam splitter for isolating one of light emitted from said light source unit, said first array lens or said second array lens to a S-polarized light beam and P-polarized light beam, a λ/2 phase differential plate for rotating the polarizing direction of one of said S-polarized light beam or said P-polarized light beam emitted from said polarized beam splitter, and a reflection unit for reflecting one of said S-polarized light beam or said P-polarized light beam;
   wherein said light source unit has an electrode wire which is provided at one side of a lamp electrode in said reflector;
   wherein said plurality of said polarizing and composing parts are arranged such that the optical axis of said polarized beam splitter is matched with the pitch of the lens optical axis of each lens cell of said first array lens and/or said second array lens in one of the vertical arrangement direction or the lateral arrangement direction, and said plurality of polarizing and composing parts have a thickness equal to or less than a thickness in the lens optical axis of said first array lens and/or said second array lens, and said plurality of said polarizing and composing parts are arranged between said light source unit and said image display element.

2. An optical unit according to claim 1, wherein at one side area where a beltlike shadow of said electrode wire crosses each lens cell of said first lens array, the number of said lens cells of said first lens array in the lateral direction or the vertical direction is equal to or greater than b/a, where "a" is a width of said beltlike shadow of said electrode wire and "b" is one of a vertical size, a lateral size or a diagonal size.

3. An optical unit comprising:
   a light source unit for emitting light;
   an image display element having a light valve in which said light emitted from said light source unit is formed in to an optical image in accordance with a video signal supplied thereto;
   a light optical system for irradiating said light from said light source unit to said image display unit;
   a projector for projecting light emitted from said image display element;
   a reflector having one of a rectangular light emitting aperture, a circular light emitting aperture and a polygonal light emitting aperture;
   a plurality of condenser lenses provided in the same size of said light emitting aperture;
   a first array lens for forming a plurality of secondary order light source image by condensing said light from said light source unit;
   a second array lens provided in the vicinity of said plurality of said secondary order light source image and focusing each of a lens image of said first array lens to said image display element;
   a plurality of polarizing and composing parts including a polarized beam splatter for isolating one of light emitted from said light source unit, said first array lens or said second array lens to a S-polarized light beam and P-polarized light beam, a λ/2 phase differential plate for rotating the polarizing direction of one of said S-polarized light beam or said P-polarized light beam emitted from said polarized beam splitter, and a reflection unit for reflecting one of said S-polarized light beam or said P-polarized light beam;
   wherein said light source unit has an electrode wire which is provided at one side of a lamp electrode in said reflector;
   wherein said plurality of polarizing and composing parts are arranged such that the optical axis of said polarized beam splitter is matched with the pitch of the lens optical axis of each lens cell of said first array lens and said second array lens in one of the vertical arrangement direction or the lateral arrangement direction, and said plurality of polarizing and composing parts are bonded symmetrically in the left and right sides or upper and lower sides of the center of said first array lens or said second array lens under the condition rotated each other by 180 degrees in such a manner that said first array lens or said second array lens is divided respectively to half areas in the right and left or upper and lower sections keeping a clearance of a column, equal to ½ of the width of said pitch.

4. An optical unit according to claim 3, wherein said plurality of polarizing and composing parts are arranged such that the optical axis of said polarized beam splitter is matched with the pitch of the lens optical axis of each lens cell of said first array lens and/or said second array lens in one of the vertical arrangement direction or the lateral arrangement direction, and said plurality or polarizing and composing parts have a thickness equal to or less than a thickness in the lens optical axis of said first array lens and/or said second array lens, and said plurality of said polarizing and composing parts are arranged between said light source unit and said image display element.

5. An optical unit according to claim 3, wherein at one side area where a beltlike shadow of said electrode wire crosses each lens cell of said first lens array, the number of said lens cells of said first lens array in the lateral direction or the vertical direction is equal to or greater than b/a, where "a" is a width of said beltlike shadow of said electrode wire and "b" is one of a vertical size, a lateral size or a diagonal size.

6. An optical unit according to claim 3, wherein the diagonal size of said image display part of said image display element is 0.7 inch, 0.9 inch or 1.3 inch and the diagonal size of said lens cells said first lens array is equal to or less than 0.18 inch.

7. An optical unit according to claim 3, wherein the diagonal size of said lens cell of said first array lens and/or a lens cell of said second array lens is equal to or less than 0.18 inch.

8. An optical unit according to claim 3, wherein total numbers of lens cells of said first array lens or said second array lens.

9. An optical unit according to claim 3, wherein a focal distance of one of said first array lens or said second array lens is within 30 mm.

10. An optical unit according to claim 3, wherein said plurality of polarizing and composing parts have a thickness equal to or less than a thickness in the lens optical axis of said first array lens and/or said second array lens, and said plurality of said polarizing and composing parts are arranged between said light source unit and said image display element.

11. An optical unit according to claim 3, wherein said reflection unit is a reflecting prism, said plurality of polarizing and composing parts are arranged such that the optical axis of said polarized beam splitter is matched with the pitch of the optical central axis of each lens cell of said first array lens and/or said second array lens in one of the vertical arrangement direction or the lateral arrangement direction, said S-polarized light beam is positioned to the center of the pitch of each lens optical axis of said first array lens and/or said second array lens, a light shielding member is provided on a optical light incidence surface to which said S-polarized light beam is emitted, that is a surface of said second array lens where is positioned at side of said polarizing and composing parts, and said light shielding member is arranged between said light source unit and said image display element.

12. A projection type image display apparatus comprising:
  a light source unit for emitting light;
  a video signal circuit for driving said image display element in accordance with a video signal;
  an image display element having a light valve in which said light emitted from said light source unit is formed in to an optical image in accordance with a video signal supplied thereto;
  a light optical system for irradiating said light from said light source unit to said image display unit;
  a projector for projecting light emitted from said image display element;
  a reflector having one of a rectangular light emitting aperture, a circular light emitting aperture and a polygonal light emitting aperture;
  a plurality of condenser lenses provided in the same size of said light emitting aperture;
  a first array lens for forming a plurality of secondary order light source image by condensing said light from said light source unit;
  a second array lens provided in the vicinity of said plurality of said secondary order light source image and focusing each of a lens image of said first array lens to said image display element;
  a plurality of polarizing and composing parts comprising a polarized beam splitter for isolating one of light emitted from said light source unit, said first array lens or said second array lens to a S-polarized light beam and P-polarized light beam, a $\lambda/2$ phase differential plate for rotating the polarizing direction of one of said S-polarized light beam or said P-polarized light beam emitted from said polarized beam sputter, and a reflection unit for reflecting one of said S-polarized light beam or said P-polarized light beam;
  wherein said light source unit has an electrode wire which is provided at one side of a lamp electrode in said reflector;
  wherein said plurality of polarizing and composing parts are arranged such that the optical axis of said polarized beam splitter is matched with the pitch of the lens optical axis of each lens cell of said first array lens and/or said second array lens in one of the vertical arrangement direction or the lateral arrangement direction, and said plurality of polarizing and composing parts have a thickness equal to or less than a thickness in the lens optical axis of said first array lens and or said second array lens, and said plurality of polarizing and composing parts are arranged between said light source unit and said image display element.

13. A projection type image display apparatus according to claim 12, wherein at one side area where a beltlike shadow of said electrode wire crosses each lens cell of said first lens array, the number of said lens cells of said first lens array in the lateral direction or the vertical direction is equal to or greater than b/a, where "a" is a width of said beltlike shadow of said electrode wire and "b" is one of a vertical size, a lateral size or a diagonal size.

14. A projection type image display apparatus:
  a light source unit for emitting light;
  a video signal circuit, for driving said image display element in accordance with a video signal;
  an image display element having a light valve in which said light emitted from said light source unit is formed in to an optical image in accordance with a video signal supplied thereto;
  a light optical system for irradiating said light from said light source unit to said image display unit;
  a projector for projecting light emitted from said image display element;
  a reflector having one of a rectangular light emitting aperture, a circular light emitting aperture and a polygonal light emitting aperture;
  a plurality of condenser lenses provided in the same size of said light emitting aperture;
  a first array lens for forming a plurality of secondary order light source image by condensing said light from said light source unit;
  a second array lens provided in the vicinity of said plurality of said secondary order light source image and focusing each of a lens image of said first array lens to said image display element;
  a plurality of polarizing and composing parts comprising a polarized beam splitter for isolating one of light emitted from said light source unit, said first array lens or said second array lens to a S-polarized light beam and P-polarized light beam, a λ/2 phase differential plate for rotating the polarizing direction of one of said S-polarized light beam or said P-polarized light beam emitted from said polarized beam splitter, and a reflection unit for reflecting one of said S-polarized light beam or said P-polarized light beam;

wherein said light source unit has an electrode wire which is provided at one side of a lamp electrode in said reflector;

wherein said plurality of polarizing and composing parts are arranged such that the optical axis of said polarized beam splitter is matched with the pitch of the lens optical axis of each lens cell of said first array lens and/or said second array lens in one of the vertical arrangement direction or the lateral arrangement direction, and said plurality of polarizing and composing parts are bonded symmetrically in the left and right sides or upper and lower sides of the center of said first array lens or said second array lens under the condition rotated each other by 180 degrees in such a manner that said first array lens or said second array lens is divided respectively to half areas in the right and left or upper and lower sections keeping a clearance of a column, equal to ½ of the width of said pitch.

15. A projection type image display apparatus according to claim 14, wherein said plurality of polarizing and composing parts have a thickness equal to or less than a thickness in the lens optical axis of said first array lens and/or said second array lens, and said plurality of said polarizing and composing parts are arranged between said light source unit and said image display element.

16. A projection type image display apparatus according to claim 14, wherein at one side area where a beltlike shadow of said electrode wire crosses each lens cell of said first lens array, the number of said lens cells of said first lens array in the lateral direction or the vertical direction is equal to or greater than b/a, where "a" is a width of said beltlike shadow of said electrode wire and "b" is one of a vertical size, a lateral size or a diagonal size.

17. A projection type image display apparatus according to claim 14, wherein the diagonal size of said image display part of said image display part of said image display element is 0.7 inch, 0.9 inch or 1.3 inch and the diagonal size of said lens cells said first lens array is equal to or less than 0.18 inch.

18. A projection type image display apparatus according to claim 14, wherein the diagonal size of said lens cell of said first array lens and/or a lens cell of said second array lens is equal to or less than 0.18 inch.

19. A projection type image display apparatus according to claim 14, wherein total numbers of lens cells of said first array lens or said second array lens.

20. A projection type image display apparatus according to claim 14, wherein a focal distance of one of said first array lens or said second array lens is within 30 mm.

21. A projection type image display apparatus according to claim 15, wherein said reflection unit is a reflecting prism, said plurality or polarizing and composing parts are arranged such that the optical axis of said polarized beam splitter is matched with the pitch of the optical central axis of each lens cell of said first array lens and said second array lens in one of the vertical arrangement direction or the lateral arrangement direction, said S-polarized light beam is positioned to the center of the pitch of each lens optical axis of said first array lens and/or said second array lens, a light shielding member is provided on a optical light incidence surface to which said S-polarized light beam is emitted, that is a surface of said second array lens where is positioned at side of said polarizing and composing parts, and said light shielding member is arranged between said light source unit and said image display element.

* * * * *